US012497264B2

(12) United States Patent
Raassina et al.

(10) Patent No.: US 12,497,264 B2
(45) Date of Patent: Dec. 16, 2025

(54) METHOD FOR OPERATING AN ELEVATOR AND ELEVATOR

(71) Applicant: KONE Corporation, Helsinki (FI)

(72) Inventors: Pasi Raassina, Helsinki (FI); Tuukka Korhonen, Helsinki (FI); Ari Hänninen, Helsinki (FI); Ari Koivisto, Helsinki (FI); Hannu Nousu, Helsinki (FI); Mikko Puranen, Helsinki (FI); Tapio Tyni, Helsinki (FI); Tommi Huotari, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1462 days.

(21) Appl. No.: 17/072,687

(22) Filed: Oct. 16, 2020

(65) Prior Publication Data

US 2021/0155446 A1 May 27, 2021

(30) Foreign Application Priority Data

Nov. 22, 2019 (EP) .................................... 19210803

(51) Int. Cl.
*B66B 1/30* (2006.01)
*B66B 1/34* (2006.01)
(Continued)

(52) U.S. Cl.
CPC .............. *B66B 1/30* (2013.01); *B66B 1/3492* (2013.01); *B66B 5/0018* (2013.01); (Continued)

(58) Field of Classification Search
CPC . B66B 1/3492; B66B 5/0018; B66B 11/0407; B66B 1/06
See application file for complete search history.

(56) References Cited

U.S. PATENT DOCUMENTS 5,146,053 A 9/1992 Powell et al.
5,373,120 A * 12/1994 Barrett .................... B66B 13/08 187/316

(Continued)

FOREIGN PATENT DOCUMENTS

CN 110461748 A 11/2019
DE 10 2017 219 400 A1 12/2018

(Continued)

OTHER PUBLICATIONS

Search Report issued in European Patent Application No. 19 21 0803, dated May 25, 2020.

(Continued)

*Primary Examiner* — Rina I Duda
(74) *Attorney, Agent, or Firm* — Birch, Stewart, Kolasch & Birch, LLP

(57) ABSTRACT

A method for operating, such as commissioning, an elevator, and an elevator are presented herein. The elevator comprises an electric linear motor for moving movable units. The method comprises moving a first movable unit along a linear stator of the electric linear motor in the elevator shaft, and determining at least one characteristic, such as a floor position or an air gap width of the electric linear motor, at a plurality of elevator shaft positions by the first movable unit, such as by a winding, a coil, or a sensor, during the moving. The method further comprises storing the determined at least one characteristic, and controlling moving of at least a second movable unit, such as comprising another of the elevator cars or a second motor unit, by utilizing the stored at least one characteristic.

20 Claims, 3 Drawing Sheets

(51) Int. Cl.

| | |
|---|---|
| ***B66B 5/00*** | (2006.01) |
| ***B66B 11/04*** | (2006.01) |
| ***H02K 41/03*** | (2006.01) |
| ***H02P 25/064*** | (2016.01) |
| *B66B 9/00* | (2006.01) |

(52) U.S. Cl.

CPC ........ *B66B 11/0407* (2013.01); *H02K 41/033* (2013.01); *H02P 25/064* (2016.02); *B66B 9/003* (2013.01)

(56) References Cited

U.S. PATENT DOCUMENTS

| | | | | |
|---|---|---|---|---|
| 5,799,755 | A * | 9/1998 | Wan | B66B 11/0407 187/289 |
| 6,199,666 | B1 * | 3/2001 | Aulanko | B66B 11/08 187/277 |
| 6,435,315 | B1 * | 8/2002 | Zaharia | B66B 1/3492 187/394 |
| 8,742,702 | B2 * | 6/2014 | Markon | H02P 25/062 318/135 |
| 2016/0214832 | A1 * | 7/2016 | Banno | B66B 5/06 |
| 2016/0297647 | A1 * | 10/2016 | Tangudu | B66B 17/12 |
| 2017/0297860 | A1 * | 10/2017 | Krishnamurthy | B66B 1/32 |
| 2017/0355553 | A1 | 12/2017 | Steinhauer et al. | |
| 2018/0248498 | A1 * | 8/2018 | Piitulainen | H02P 25/064 |
| 2018/0262146 | A1 * | 9/2018 | Raassina | H02K 11/21 |
| 2019/0248625 | A1 * | 8/2019 | Mustonen | B66B 5/0037 |
| 2019/0359447 | A1 * | 11/2019 | Hakala | B66B 1/3461 |
| 2020/0102184 | A1 | 4/2020 | Thum et al. | |

FOREIGN PATENT DOCUMENTS

| | | | |
|---|---|---|---|
| JP | 4-317966 | A | 11/1992 |
| JP | 2002-101682 | A | 4/2002 |
| JP | 2013-170081 | A | 9/2013 |
| JP | 2014-105050 | A | 6/2014 |
| WO | WO 2018/177829 | A1 | 10/2018 |

OTHER PUBLICATIONS

English translation of Japanese Office Action for Japanese Application No. 2020-184835, dated Oct. 24, 2024.

European Office Action for European Application No. 19 210 803.3, dated Dec. 1, 2022.

* cited by examiner

METHOD FOR OPERATING AN ELEVATOR AND ELEVATOR

FIELD OF THE INVENTION

The present invention relates in general to elevators. In particular, however not exclusively, the present invention concerns operating an elevator, especially, commissioning it for use.

BACKGROUND

There are known elevators with linear motors. In such elevators, bending of the linear parts of the motor or possible unevenness thereof can cause issues to the ride comfort. Installation of the linear parts of the motors have certainly higher tolerances compared to rotating motor solutions, such as in traditional elevators, that are centered by mechanical bearing. Also, joints between the linear parts can play a role in ride comfort, especially in turning stations, where there might be relatively long gaps.

On the other hand, shaft setup is part of the elevator commissioning process. An elevator car is slowly driven through the whole shaft reading all installed position indicators, measures the distance travelled using typically car and/or motor encoders and in some cases absolute position sensor, and then saves the information in a memory.

In elevators having a plurality of elevator cars, the conventional shaft setup process is time consuming due to high number of cars in the elevator shafts. Possibility to move also horizontally makes the shaft setup process even more challenging. If the elevator includes of, for example 40 elevator cars, 3 vertical shafts and 6 horizontal paths, driving all elevator cars through all shaft sections could take even days.

SUMMARY

An objective of the present invention is to provide a method for operating an elevator and an elevator. Another objective of the present invention is that the method and the elevator alleviates at least some of the drawbacks of the known elevators, such as related to ride comfort and/or commissioning.

The objectives of the invention are reached by a method and an elevator as defined by the respective independent claims.

According to a first aspect, a method for operating, such as commissioning, an elevator is provided, wherein the elevator comprises an electric linear motor for moving movable units, such as elevator cars or motor units, in an elevator shaft. The method comprises:

- moving a first movable unit, such as comprising one of the elevator cars or a motor unit, along a linear stator of the electric linear motor in the elevator shaft,
- determining at least one characteristic, such as a floor position or an air gap width of the electric linear motor, at a plurality of elevator shaft positions by the first movable unit, such as by a winding, a coil, or a sensor, during the moving,
- storing the determined at least one characteristic, and
- controlling moving of at least a second movable unit, such as comprising another of the elevator cars or a second motor unit, by utilizing the stored at least one characteristic.

The movable unit, such as the first movable unit and/or the second movable unit, according to the present invention may refer, for example, to an elevator car which is arranged to be moved by a mover or movers of an electric linear motor of the elevator in the elevator shaft. However, alternatively, the movable unit(s) may refer to a motor unit. The motor unit may be, in some embodiments, the mover of the electric linear motor which may be moved as such in the elevator shaft. The motor unit may, preferably, also comprise electrical power providing means for providing electrical power to the mover, such as from an electrical energy storage, for example, a battery or batteries. Furthermore, the motor unit may comprise a controller for controlling the movement. The elevator car, or specifically the "cage" into which the passengers enter, may then be removably coupled to the motor unit for moving the elevator car. However, in various embodiments, the motor unit may be arranged to be moved in the elevator shaft and along the stator beam independently of the elevator car.

In various embodiments, the method may comprise storing the determined at least one characteristic to a memory device of the second movable unit.

In various embodiments, the method may comprise storing the determined at least one characteristic to an elevator control unit, such as having a non-volatile memory device.

In some embodiments, the at least one characteristic may include position or distance data, such as positions of final limits, floors, and/or door zones, and/or related to a direction changing position, based on position indicators, such as an optical or a magnetic code tap.

In some embodiments, the linear stator may comprise markers, such as magnetic teeth or auxiliary markers, for indicating positions.

In various embodiments, the method may comprise updating the stored at least one characteristic by any one of said movable units when moving along the linear stator of the electric linear motor in the elevator shaft.

In some embodiments, the at least one characteristic may be a width of an air gap of the electric linear motor. Alternatively or in addition, the at least one characteristic may relate to electromotive force of the electric linear motor. Furthermore, the method may comprise controlling moving of at least a second movable unit by controlling electrical current supplied to the electric linear motor based on the determined air gap and electromotive force at the plurality of positions of the elevator shaft.

In various embodiments, a mover of the electric linear motor comprises a plurality of independently controllable base motors or motor subunits, wherein the method may comprise controlling movement of the mover along the linear stator by at least one of the plurality of independently controllable base motors or motor subunits, and determining the at least one characteristic by at least one other of the plurality of independently controllable base motors or motor subunits. In addition, the electric linear motor may comprise at least three or four independently controllable base motors or motor subunits, wherein the method may comprise controlling the movement of the mover along the linear stator by at least by the outermost base motors or motor subunits.

According to a second aspect, an elevator is provided. The elevator comprises an electric linear motor for moving movable units, such as elevator cars or motor units, in an elevator shaft, wherein the electric linear motor comprises a linear stator extending in the elevator shaft. The elevator further comprises a first movable unit, such as comprising one of the elevator cars or a motor unit, arranged to be moved along the linear stator and configured for determining at least one characteristic, such as a floor position or an air gap width of the electric linear motor, at a plurality of elevator shaft positions by the first movable unit during the moving. Still further, the elevator comprises a second movable unit, such as comprising another of the elevator cars or a second motor unit, by utilizing the stored at least one characteristic. The first movable unit is configured determine and store the at least one characteristic during moving along the linear stator, and the second movable unit is configured to utilize the stored at least one characteristic, such as in a memory device, for controlling its moving along the linear stator.

In various embodiments, the at least one characteristic may be position or distance data, such as positions of final limits, floors, and/or door zones, and/or related to a direction changing position, based on position indicators, such as an optical or a magnetic code tap. Alternatively or in addition, the at least one characteristic may be an air gap width and/or an electromotive force of the electric linear motor.

In some embodiments, at least the first movable unit may comprise a mover of the electric linear motor comprising a plurality of independently controllable base motors or motor subunits. In addition, the first movable unit may be configured to control movement of the mover along the linear stator by at least one of the plurality of independently controllable base motors or motor subunits, and to determine the at least one characteristic by at least one other of the plurality of independently controllable base motors or motor subunits.

The present invention provides a method for operating an elevator and an elevator. The present invention provides advantages over known solutions in that shaft setup information is used for controlling the propulsion force and, optionally, normal force generated by the motor. This improves ride comfort issues due to inaccuracy and also saves a lot of time in shaft setup in multi-car elevators. This is especially critical in cases, where shaft setup of an operating elevator has been lost for some reason. The higher the number of cars is, the bigger the benefit.

Various embodiments of the present invention make the installation of position-code based absolute positioning system of the elevator easier. Typically, these kinds of systems have continuous, incremental position code throughout the whole shaft. In multi-car elevators, elevator run is not a single straight line, which would be a challenge for code tape installation. Inevitably there will be discontinuities in position code if the travel path changes from vertical to horizontal. This could be solved by preparing special dedicated code tapes for certain shaft sections, which would make the installation challenging. Using method proposed in this invention and saving the code tape information during the shaft setup (and sharing the information between cars), would eliminate the need of dedicated code tapes.

Various other advantages will become clear to a skilled person based on the following detailed description.

The expression "a plurality of" may refer to any positive integer starting from two (2), that is, being at least two.

The terms "first", "second" and "third" are herein used to distinguish one element from another element, and not to specially prioritize or order them, if not otherwise explicitly stated.

The exemplary embodiments of the present invention presented herein are not to be interpreted to pose limitations to the applicability of the appended claims. The verb "to comprise" is used herein as an open limitation that does not exclude the existence of also unrecited features. The features recited in depending claims are mutually freely combinable unless otherwise explicitly stated.

The novel features which are considered as characteristic of the present invention are set forth in particular in the appended claims. The present invention itself, however, both as to its construction and its method of operation, together with additional objectives and advantages thereof, will be best understood from the following description of specific embodiments when read in connection with the accompanying drawings.

BRIEF DESCRIPTION OF FIGURES

Some embodiments of the invention are illustrated by way of example, and not by way of limitation, in the figures of the accompanying drawings.

DETAILED DESCRIPTION OF SOME EMBODIMENTS

Figure 1:
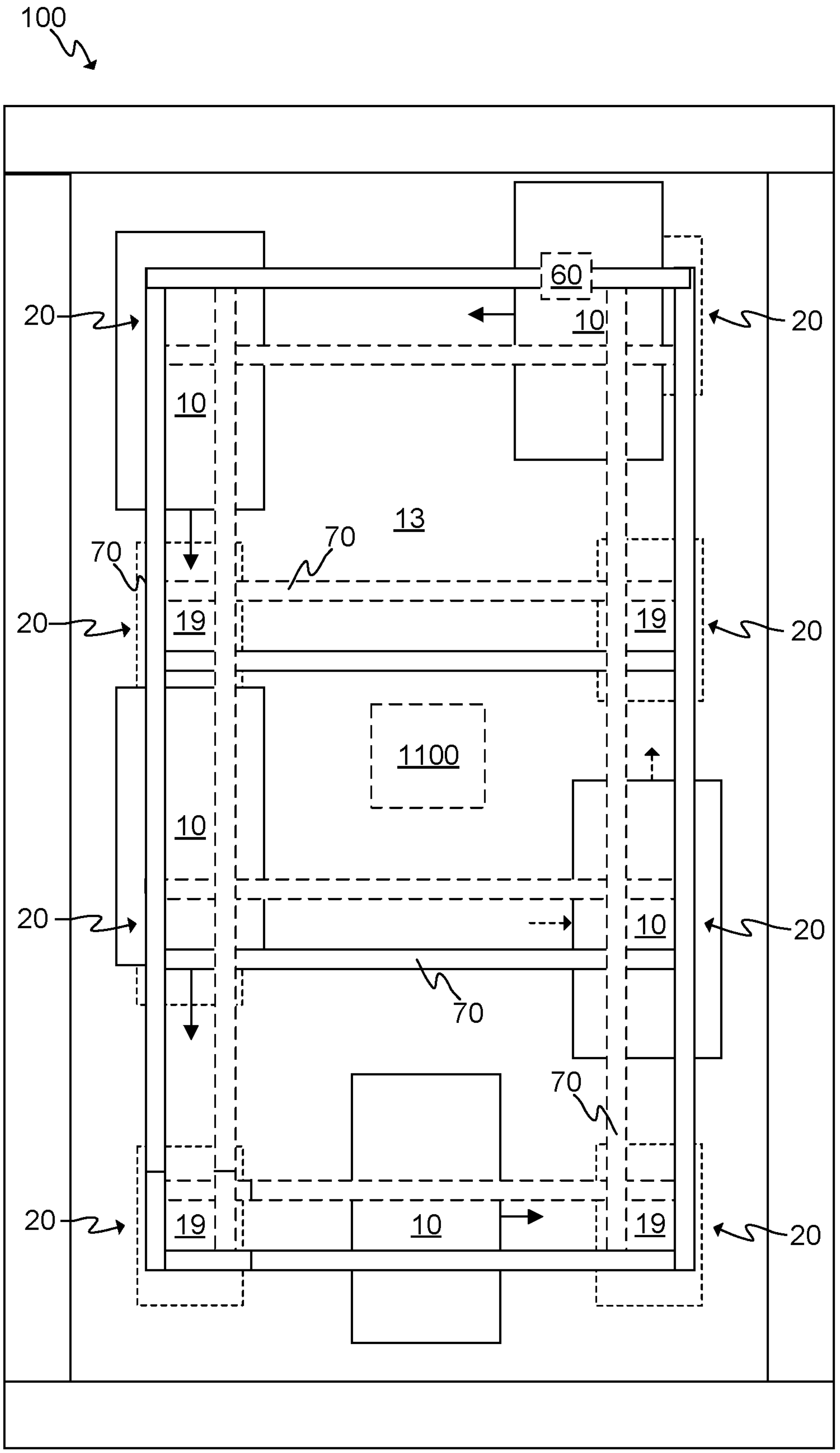
FIG. 1 illustrates schematically an elevator according to an embodiment of the present invention.

FIG. 1 illustrates schematically an elevator 100 according to an embodiment of the present invention. The elevator 100 may comprise at least one or a plurality of movable units 10, such as elevator cars or motor units, moving in the elevator shaft 13 or the elevator car pathway 13.

The movable unit 10 according to the present invention may refer, for example, to an elevator car which may, preferably, be arranged to be moved by a mover 60 or movers 60 of an electric linear motor of the elevator in the elevator shaft 13. Only one mover 60 is shown in FIG. 1 for the sake of legibility. However, alternatively, the movable unit(s) 10 may refer to one or several motor units. The motor unit may be, in some embodiments, essentially a mover of the electric linear motor which may be moved as such in the elevator shaft. The motor unit may, preferably, also comprise electrical power providing means for providing electrical power to the mover, such as from an electrical energy storage, for example, a battery or batteries. Furthermore, the motor unit may comprise a controller for controlling the movement, such as including an electrical converter, such as an inverter. The elevator car, or specifically the "cage" into which the passengers enter, may then be removably coupled to the motor unit for moving the elevator car. However, in various embodiments, the motor unit may be arranged to be moved in the elevator shaft and along the stator beam independently of the elevator car.

There are preferably at least two landing floors, having landing floor doors 19 or openings 19, comprised in the elevator 100. There may also be doors comprised in the movable unit 10, such as an elevator car. Although shown in FIG. 1 that there are two horizontally separated sets, or "columns", of vertically aligned landing floors, there could as well be only one column, that is vertical shafts, as in conventional elevators or more than two, for example, three, or even more. There can be as fewer, as many or more horizontal paths from one vertical shaft to another compared to the number of vertical shafts.

Regarding the elevator shaft 13, it may be such as defining substantially closed volume in which the movable unit 10 is adapted and configured to be moved. The walls may be, for example, of concrete, metal or at least partly of glass, or any combination thereof. The elevator shaft 13 herein refers basically to any structure or pathway along which the movable unit 10 is configured to be moved.

As can be seen in FIG. 1 with respect to the elevator 100, the movable unit 10 or cars 10, that is a multi-car elevator, may be moved along the elevator shaft 13 vertically and/or horizontally depending on the direction of stator beams 70. According to embodiments similar to one in FIG. 1 in this respect, the movable unit 10 or units 10 may be configured to be moved along at least one of vertical 70 and/or horizontal 70 stator beams, for example, two beams such as in FIG. 1. The stator beams 70 are part of an electric linear motor of the elevator 100 utilized to move the movable unit 10 or units 10 in the elevator shaft 13. The stator beams 70 may, preferably, be arranged in fixed manner, that is, stationary with respect to the elevator shaft 13, for example, to a wall of the shaft by fastening portions, which may be arranged to rotatable at direction changing positions 20 of the movable unit 10.

The elevator 100 may comprise an elevator control unit 1100 for controlling the operation of the elevator 100, such as the device or devices. The elevator control unit 1100 may be a separate device or may be comprised in the other components of the elevator 100. The elevator control unit 1100 may also be implemented in a distributed manner so that, e.g., one portion of the elevator control unit 1100 may be comprised in the electrical converter unit and another portion in the movable unit 10 and/or in the elevator shaft 13. The elevator control unit 1100 may also be arranged in distributed manner at more than two locations or in more than two devices. Advantageously, the elevator control unit 1100 has been arranged to be in connection, such as in electrical connection and/or in data communication, with the device(s) and, optionally, movable unit(s) 10.

The elevator control unit 1100 may comprise one or more processors, one or more memories being volatile or non-volatile for storing portions of computer program code and any data values and possibly one or more user interface units. The mentioned elements may be communicatively coupled to each other with e.g. an internal bus.

The processor of the elevator control unit 1100 may at least be configured to perform various tasks related to the operation of the elevator 100. The implementation of such tasks may be achieved by arranging the processor to execute at least some portion of computer program code stored in the memory causing the processor, and thus the elevator control unit 1100, to implement one or more the tasks. The processor may thus be arranged to access the memory and retrieve and store any information therefrom and thereto. For sake of clarity, the processor herein refers to any unit suitable for processing information and control the operation of the elevator control unit 1100, among other tasks. The operations may also be implemented with a microcontroller solution with embedded software. Similarly, the memory is not limited to a certain type of memory only, but any memory type suitable for storing the described pieces of information may be applied in the context of the present invention.

Figure 2:
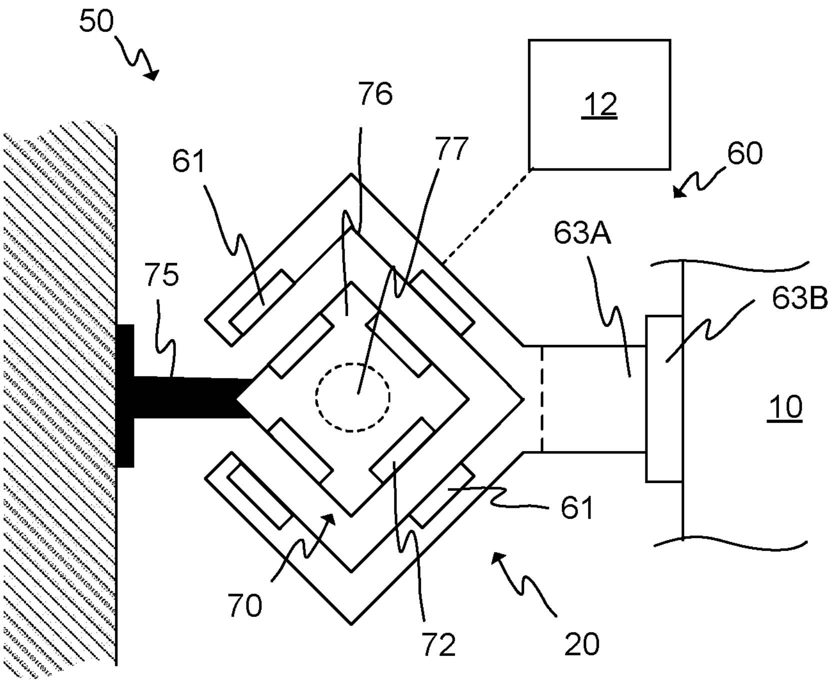
FIG. 2 illustrates schematically an electric linear motor according to an embodiment of the present invention.

FIG. 2 illustrates schematically an electric linear motor 50, or at least a part thereof, according to an embodiment of the present invention. The electric linear motor 50 may comprise a mover 60, preferably, a C-shaped or U-shaped (not shown) mover 60. The mover 60 may comprise at least one or several permanent magnets and/or magnetic core element(s) or ferromagnetic material, and optionally, a unit or units of electromagnetic components 61 comprising at least one coil or winding. The unit or units of electromagnetic components 61 may, preferably, be comprised in the mover 60 and adapted to face the stator 72 or stators 72 of the stator beam 70, as shown in FIG. 2, for instance. There may also be a support portion 63A by which mover 60 may be attached or coupled to the movable unit 10, for example, to the back wall of the car 10. As can be seen, the mover 60 may be shaped and designed in such a way as to enable the movement of the mover 60 along the stator beam 70 without interference from the fastening or support portions 63A, 63B. There may, furthermore, be further support portions 63B utilized to attach the mover 60 to the movable unit 10. The further support portion 63B may be rotatable, for instance.

In some embodiments, the mover 60 or the movers 60 may be part of a motor unit. The motor unit may, preferably, also comprise electrical power providing means for providing electrical power to the mover, such as from an electrical energy storage, for example, a battery or batteries. Furthermore, the motor unit may comprise a controller for controlling the movement. The elevator car, or specifically the "cage" into which the passengers can enter, may then be removably coupled to the motor unit for moving the elevator car. However, in various embodiments, the motor unit may be arranged to be moved in the elevator shaft and along the stator beam independently of the elevator car or any elevator car of the elevator.

The movement of the mover 60 along the stator beam 70 may be implemented by known control methods, such as, field-oriented or vector control or the like. The basic idea is to produce an alternating magnetic field, for example by an electrical converter 12, such as an inverter, for example a three-phase inverter, by injecting current to a unit of electromagnetic components 61 of the mover 60, such as to a winding or coil thereof. The unit of electromagnetic components 61 facing the stator 72 then co-acts with the stator 72 through the electromagnetic engagement and produces a force which moves the mover 60 and thus, optionally, the movable unit 10 along the stator beam 70.

According to a preferable embodiment of the present invention, the stator beam 70, as shown in FIG. 2, may comprise at least one stator 72, however, preferably two or four stators 72 arranged on opposite or each side of the stator beam 70. The stator beam 70 further comprises a beam part 76 which, in some embodiments, may be made mainly of non-magnetic material, that is, material that is not capable of being magnetized. "Capable of being magnetized" refers herein to a degree of magnetization which may be regarded as magnetization suitable for being utilized in magnetic circuits in a typical manner and, thus, relates to materials which are substantially affected by the magnetic field or flux.

Non-magnetic materials may be those which are not affected or are slightly affected by magnetic field or flux. Non-magnetic materials may be, for example, paramagnetic, diamagnetic or weakly ferromagnetic materials, or combinations thereof, with a relative magnetic permeability less than or equal to 2.0 or advantageously less than or equal to 1.5. In general, the beam part 76 may comprise non-metal, preferably non-magnetic, material. These materials may include, for example, however, not limited to, polymers, or polymer composites, wood, and/or glass. According to some embodiments of the present invention, the beam part 76 material may comprise glass fibre(s) or carbon fibre(s). According to some embodiments, the parts made of fibre material, such as aramid fibre, may be coated with material withstanding heat in order to improve the resistance of the fibre material to heat, for example in case of a building fire. The use of aramid fibres can be advantageous due to its ability to withstand mechanical impulses better than glass or carbon fibres.

The use of carbon fibre material in the beam part 76 provides a surprising advantage, in addition to other factors such as low weight, by its negative coefficient of thermal expansion. For example, if the temperature of the stator 72 increases and, thus the stator 72 expands, the beam part 76 may be used to provide compensation by shrinking, as the stator beam 70 is fixedly attached to the surrounding structures, due to its negative thermal expansion coefficient, that is, giving more room for the stator 72 to expand and alleviating the mechanical stress caused by the expansion of the stator 72 to the stator beam 70.

According to various embodiments of the present invention, the stator beam 70 may further comprise a hole 77 or a recess 77 or a through-hole 77, that is, the stator beam 70 is hollow, essentially in the stator beam 70. The hole 77 may be utilized for locking and/or aligning consecutive stator beam parts together, for example, by a pin or a dowel. The dowel may be inserted into the holes 77 of both of the consecutive stator beam parts or only other one of the stator beam parts comprises the hole while the other comprises the dowel as a counter-part for the aligning and, preferably, locking the stator beam parts relative to each other. The through-hole 77 further reduces the mass of the stator beam 70.

Manufacturing the stator beam 70 of non-magnetic, such as composite, material, for example, glass fibre composite, facilitates an accurate manufacturing of the stator beam 70 with respect to manufacturing of conventional stator beams which are manufactured by using ferromagnetic material, such as steel, having high permeability and thus significant magnetic properties. Furthermore, the stator beam 70 made of non-magnetic material as described herein also facilitates the installation and operation of the electric linear motor as the composite stator beam 70, such as comprising glass or carbon fibre material, undergoes less thermal expansion relative to conventional stator beams 70. Still another benefit of using the composite stator beam 70 is that composite is non-magnetic material unlike some metals and thus affects less the operation of the magnetic circuit of the linear electric motor. The stators 72 arranged to the stator beam 70 of non-magnetic material, such as of composite, facilitates designing the motor from the magnetic coupling between the mover 60 and the stator 72 point of view.

Figure 3:
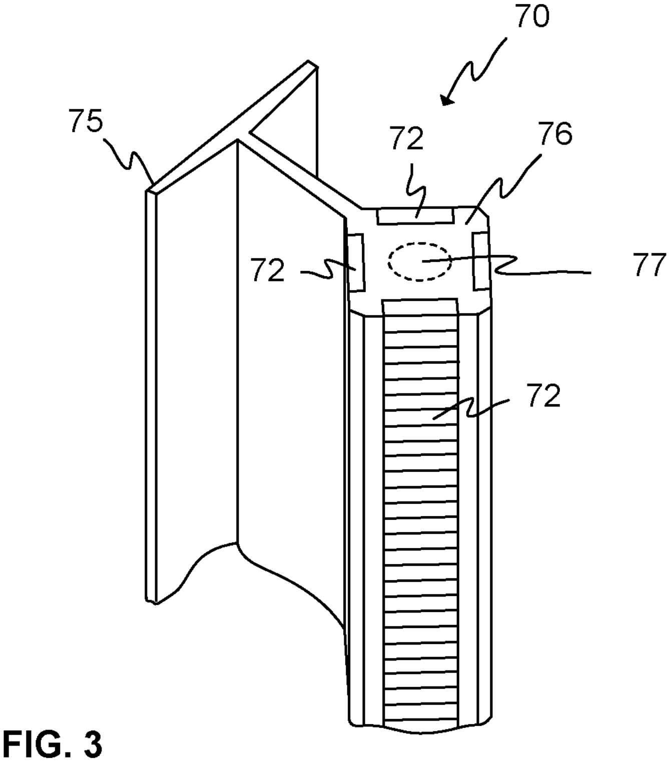
FIG. 3 illustrates schematically an electric linear motor according to an embodiment of the present invention.

FIG. 3 illustrates schematically a part of the stator beam 70, or a stator beam part, according to an embodiment of the present invention by a perspective view. The part of the stator beam 70 comprises at least one stator 72 extending substantially along the whole stator beam 70. There may, advantageously, be four stators 72 arranged at all four sides of the stator beam 70, such as in FIG. 3. There may also be a fastening portion 75 or portions 75 by which said part 70 may be attached in fixed manner to the structures, such as a wall, of the elevator shaft 13. The fastening portion 75 may also be a separate fastening portion which may then be attached to the stator beam 70 for arranging the stator beam 70 into the elevator shaft 13 or the fastening portion 75 may be an integrated part of the stator beam 70 or a part thereof. The stators 72 may, preferably, be of ferromagnetic material and comprise teeth on their outer surface for providing a suitable magnetic circuit for co-acting with the mover 60. According to a preferable embodiment of the present invention, the stator beam 70 or beams 70 are passive in the sense that they do not comprise controllable elements or components, such as coils, for controlling the movement of the mover 60 along the stator beam 70.

In FIG. 3, a stator 72 or each of the stators 72 may be attached to the stator beam 70 by having suitable shape or a recess into which the stator 72 may be arranged in, that is, by interlocking the stator(s) 72 to the stator beam 70. This may be implemented by having protruding portions in the stator beam 70 for keeping the stator 72 in place. The stator 72 or stators 72 may be, for example, slid into place, or into the recess arranged to the stator beam 70, from one end of the stator beam 72. Alternatively or in addition, the stator 72 may be attached to the stator beam 70 by using adhesives, such as using introducing glue on the back of the stator 72 before arranging the stator 72 into to the recess in the stator beam 70.

In some embodiments, the mover 60 according to the present invention, either being coupled to the elevator car or being part of the motor unit, may comprise at least one, preferably at least two or three, portions by which at least one characteristic, for example a floor position or an air gap width of the electric linear motor, or a value of electromotive force together with an airgap width, and a position information, such as an absolute or relative or incremental position, may be determined, while other portions may be used for propulsion force generation and, optionally, also for normal or levitation force generation. In some embodiments, each of the portions may comprise windings or at least coil or coils which can be independently operated with respect to the other portions. Alternatively or in addition, one or several, or each one, of the portions may comprise a sensor or sensors, such as proximity sensor(s), for determining the at least one characteristic. Regardless of the embodiment, the portion, being part of the movable unit 10, may be configured to determine such characteristic related to the electric linear motor 50 and/or the elevator shaft 13.

Figure 4:
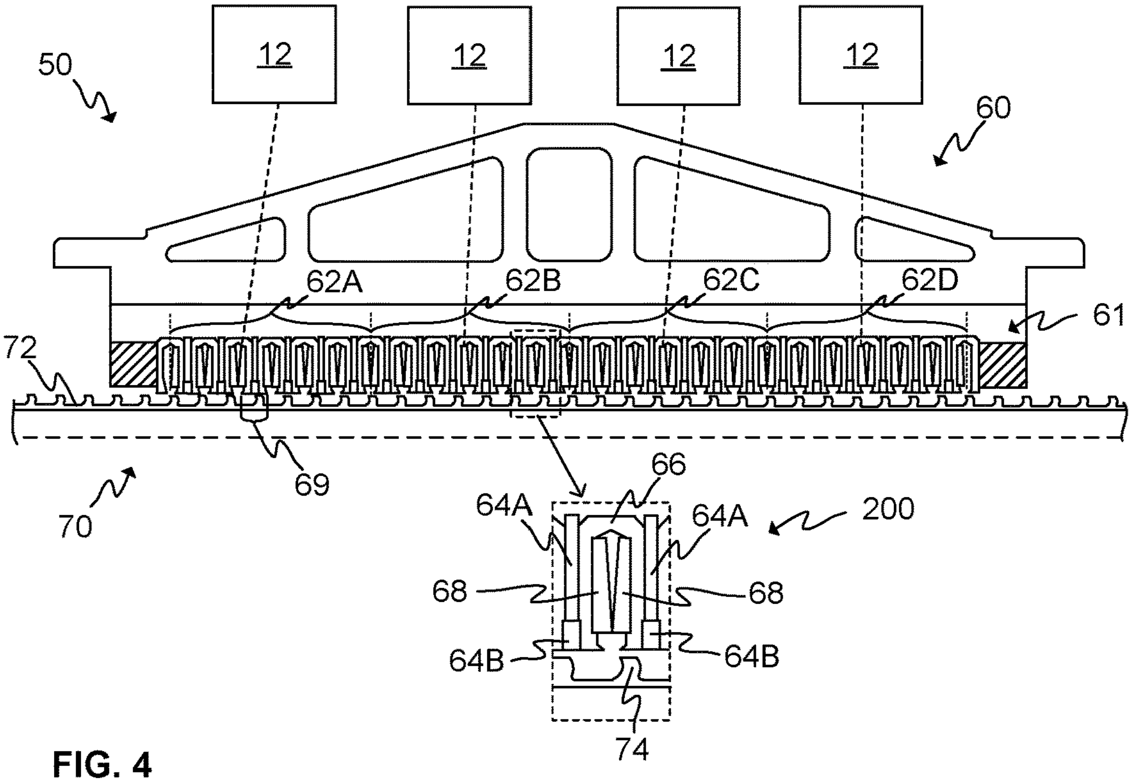
FIG. 4 illustrates schematically an electric linear motor according to an embodiment of the present invention.

FIG. 4 illustrates schematically an electric linear motor 50 according to an embodiment of the present invention. The electric linear motor 50 may comprise a mover 60 and a stator beam 70. The mover 60 may comprise a unit or units of electromagnetic components 61. One or several of the units 61 may be divided, at least functionally, if not mechanically, into a plurality, that is at least two, three, or four, for instance, of base motors 62A-62D or motor subunits 62A-62D.

In FIG. 4, the unit 61 defines four base motors 62A-62D or motor subunits 62A-62D. The base motors 62A-62D may, preferably, be independently controllable or operable. In an embodiment, three of the base motors 62A-62D, including outermost ones 62A, 62D, are arranged to be utilized for propulsion force generation. Optionally, said three base motors may in addition be used for normal or levitation force generation. In some embodiments, especially if the normal force generation is not sufficient or is lacking, there may be guide rail(s) and/or bearing(s) used to control the position of the unit 61 and/or the mover 60 relative to the normal direction. However, one of the base motors 62A-62D in the middle, that is marked with 62B or 62C, may be utilized for determining at least one characteristic, such as a floor position or an air gap width of the electric linear motor 50, at a plurality of elevator shaft positions by a sensor of the first movable unit 10 during the movement of the unit 10. This may require stopping the modulation of the selected base motor in the middle 62B, 62C, and then, when the mover 60 is moved along the stator beam 70, recording the at least one characteristic, for example electromotive force together with an airgap width and a position information, such as an absolute or a relative position.

In various embodiments, the mover 60 may comprise, as shown in the enlarged view at 200, permanent magnets 64A, 64B, coils 68, and ferromagnetic material 66 or an iron core 66 defining a magnetic circuit in the mover 60, such as also defining a yoke between mover teeth 69.

Furthermore, the mover 60 may comprise mover teeth 69, and the stator 72 may comprise stator teeth 74. Thus, the air gap width between the mover 60 and the stator 70 may be determined based on the distance between a mover tooth 69 and a stator tooth 74 when being aligned, or based on the perpendicular distance therebetween.

According to another embodiment in which the unit 61 comprises individually controllable coils of the winding, such as controlled by an H-bridge type converter, a plurality, such as three, individual middle coils of each unit 61 may be utilized for recording the at least one characteristic, for example electromotive force together with an airgap width and a position information, such as an absolute or a relative position, while other coils are utilized for propulsion and levitation force generation.

Figure 5:
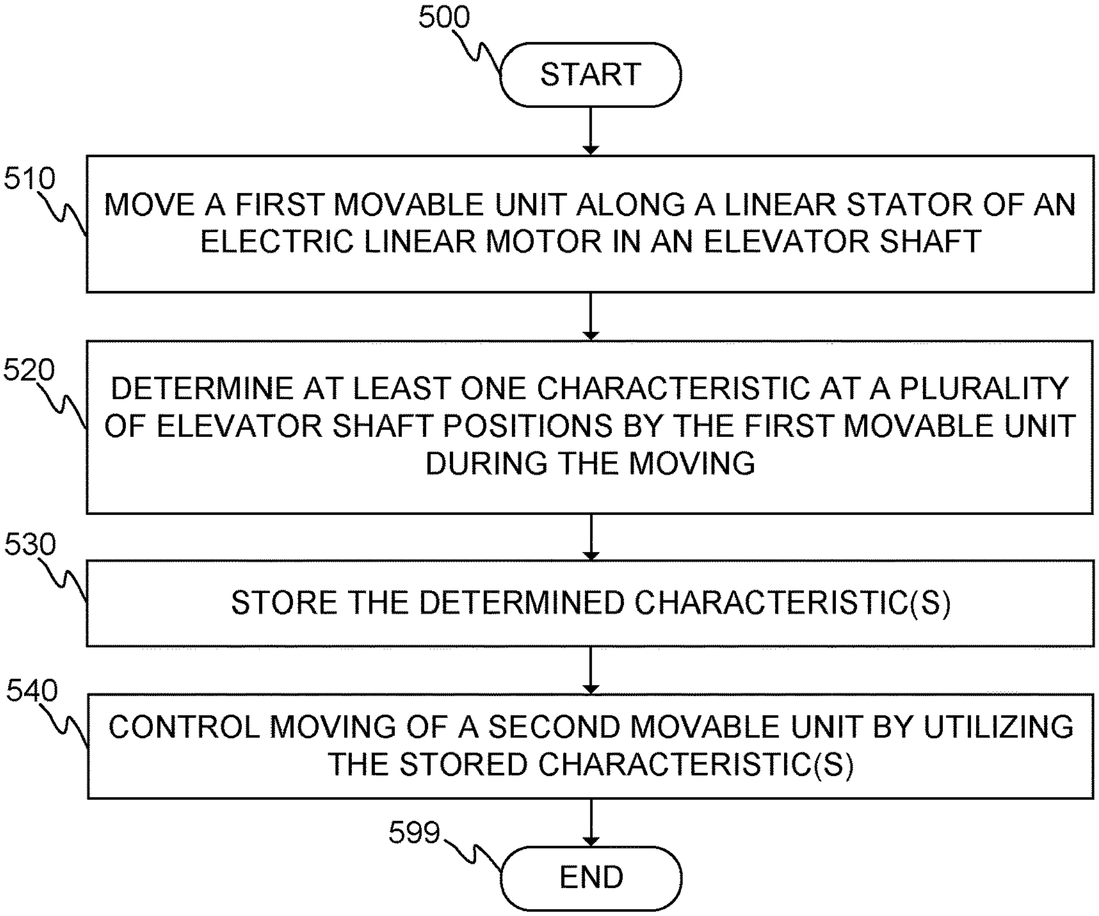
FIG. 5 illustrates a flow diagram of a method according to an embodiment of the present invention.

FIG. 5 shows a flow diagram of a method in accordance with an embodiment of the present invention.

Step 500 refers to a start-up phase of the method. Suitable equipment and components are obtained, and systems assembled and configured for operation.

This may also entail that running normal motor setup routines so that motor can run along the stator beam, and/or activating the shaft and airgap positioning, and/or starting levitation of the mover 60, and thus the movable unit 10, with respect to the stator beam 70.

Step 510 refers to moving a first movable unit 10, such as comprising one of the elevator cars or a motor unit, along a linear stator 72 of the electric linear motor 50 in the elevator shaft 13.

Step 520 refers to determining at least one characteristic, such as a floor 19 position or an air gap width of the electric linear motor 50, at a plurality of elevator shaft positions by the first movable unit 10, such as by a winding, a coil, or a sensor, during the moving.

In various embodiments, the mover 60 of the electric linear motor 50 may comprise a plurality of independently controllable base motors 62A-62D or motor subunits 62A-62D, preferably, arranged consecutively in a longitudinal direction of the mover 60. The method may then comprise controlling movement of the mover 60 along the linear stator 72 by at least one of the plurality of independently controllable base motors 62A-62D or motor subunits 62A-62D, and determining the at least one characteristic by at least one other of the plurality of independently controllable base motors 62A-62D or motor subunits 62A-62D.

Alternatively or in addition, the electric linear motor 50 may comprise at least three or four independently controllable base motors 62A-62D or motor subunits 62A-62D, and the method may comprise controlling the movement of the mover 60 along the linear stator 72 by at least by the outermost base motors 62A, 62D or motor subunits 62A, 62D, or in addition one of the middle base motors 62A, 62D or motor subunits 62A, 62D.

In some embodiments, the at least one characteristic may be a width of an air gap of the electric linear motor 50.

In various embodiments, the at least one characteristic may be an electromotive force (EMF) value in the plurality of positions along the stator 72. The EMF value depends on the airgap between stator 72 and mover 60, specifically the units of electromagnetic components 61 thereof. The EMF value variation thus corresponds to the stator surface variation, for example, due to a stator joint or joints, that is, joints between the stator beam parts 70, and/or joint(s) between the stator 72 and an element, such as a stator beam part thereof, of the direction changing position 20.

In various embodiments, the element of the direction changing position 20 may be arranged to be rotated or moved relative to the adjacent stator beam part 70 of the stator 72 in order to change the direction of movement of the movable unit 10, such as from vertical to horizontal, or vice versa, or between any two directions defined by the stator beam parts 70. Thus, there may be a gap between said stator beam part 70 and the element in order to be able to move said components with respect to each other. This has an effect on the EMF at said positions.

Alternatively or in addition, the at least one characteristic may include position or distance data, such as positions of final limits, floors, and/or door zones, based on position indicators, such as an optical or a magnetic code tap.

Alternatively or in addition, the at least one characteristic may include position or distance data related to the direction changing position 20 or positions 20 based on position indicators, such as an optical or a magnetic code tap, or based on measuring the EMF value at the gap/joint therebetween as described hereinbefore.

In various embodiments, alternatively or in addition, the at least one characteristic, based on the width of the air gap and/or to the EMF value, may be Step 530 refers to storing the determined at least one characteristic. The storing may be done into a memory comprised in the first movable unit 10, and/or in connection with the elevator control unit 1100, such as having a non-volatile memory device. The stored data may comprise the at least one characteristic, such as related to the air gap width, as a function with the elevator shaft position. Thus, the stored value may be used in other movable units 10, or even later in the same unit 10, when the position of the movable unit 10 is known and compared to the position information being stored.

In some embodiments, the method may comprise storing the determined at least one characteristic to a memory device of the second movable unit 10.

Step 540 refers to controlling moving of at least a second movable unit, such as comprising another of the elevator cars or a second motor unit, by utilizing the stored at least one characteristic. In addition, the method may comprise controlling of the moving of at least one second movable unit 10 by controlling electrical current supplied to the electric linear motor 50 based on the determined air gap and electromotive force at the plurality of positions of the elevator shaft 13.

In various embodiments, the stored at least one characteristic may be used in controlling the moving of the second movable unit 10 by utilizing the stored information in the controller of the mover 60. In an embodiment, the information is used in a current controller, or controllers, of the electrical converter 12 operating the mover 60. This may be implemented by adding a feed-forward term into the control loop; the feed-forward term being based on the stored characteristic. In an embodiment, the stored information is used as feed-forward terms in either one or both of the quadrature (q) and the direct (d) axis current controllers. Thus, as the operation of the mover 60 is controlled based on the stored characteristic, the propulsion and/or levitation force components can be controlled based on the position of the movable unit 10 in the elevator shaft 13. The advantage is that this improves ride comfort which would otherwise be compromised due to the inaccuracies in the electric linear motor 50, that is between the mover 60 and the linear stator 72.

Method execution is ended at step 599. The method may be performed once, intermittently, periodically, continuously or, on demand.

Thus, the method provides the effect that, when a multi-car elevator is commissioned (or the shaft setup has been lost or changed), a single movable unit 10, such as an elevator car or a motor unit, can be used to drive through all the shaft sections. During this process, the movable unit 10 determines and stores, such as in non-volatile memory, all position indicators in the elevator shaft 13 (for example final limits, floors, door zones etc.) and measures the distance between them using, for example, encoder, incremental or absolute positioning system, depending on the embodiment.

In some embodiments, the method may comprise updating, such as when the method is being performed many times, the stored at least one characteristic by any one of the movable units 10 when moving along the linear stator 72 of the electric linear motor 50 in the elevator shaft 13.

Absolute and/or incremental positioning system may be an additional processing logic relying on an encoder signal and other positioning indicators, or a separate system based on, for example, magnetic or optical code tape installed in the shaft 13.

Alternatively or in addition, the positioning system, such as an incremental positioning system, may comprise having certain markers arranged into the stator 72 or elsewhere in the stator beam 70; the markers being, for example, magnetic teeth or auxiliary markers. These markers may be detectable by utilizing the unit of electromagnetic components 61 in the mover 60, or by a separate sensor, for example, based on infrared, light, capacitance, or inductance, etc.

If absolute positioning system is based on incremental number read from, for example, optical or magnetic code tape, also relevant position code information is saved (for example, the code in the beginning and in the end of each shaft section). Then when one movable unit 10 has finished the shaft setup process, the shaft information can then be copied to all other movable units 10 so that they will know the shaft information without any additional shaft setup drive.

In some embodiment, the sharing information about the at least one characteristic can, alternatively or in addition, be used to counteract inaccuracies in positioning system caused by thermal expansion of positioning code tape or guide rail. If one or more movable units 10, during normal use, detect that distance between floors 19 differs from that stored during the shaft setup by a movable unit 10, a correction information could then be communicated to all other movable units 10.

The invention claimed is:

1. A method for operating an elevator, wherein the elevator comprises an electric linear motor for moving movable units such in an elevator shaft, the method moving a first movable unit, comprising one of the elevator cars or a motor unit, along a linear stator of the electric linear motor in the elevator shaft as a commissioning operation of the elevator;

determining at least one characteristic, including a floor position or an air gap width of the electric linear motor, at a plurality of elevator shaft positions by the first movable unit, by a winding, a coil, or a sensor, during the moving;

storing the determined at least one characteristic; and controlling moving of at least a second movable unit, comprising another of the elevator cars or a second motor unit in a normal operation of the elevator, by utilizing the stored at least one characteristic in a feed-forward manner, wherein control parameters of the electric linear motor are adjusted based on the stored at least one characteristic corresponding to a determined position of the second movable unit along the elevator shaft.

2. The method of claim 1, comprising storing the determined at least one characteristic to a memory device of the second movable unit.

3. The method of claim 1, comprising storing the determined at least one characteristic to an elevator control unit, having a non-volatile memory device.

4. The method of claim 1, wherein the at least one characteristic includes position or distance data, including positions of final limits, floors, and/or door zones, and/or related to a direction changing position, based on position indicators, including an optical or a magnetic code tap.

5. The method of claim 1, wherein the linear stator comprises markers, including magnetic teeth or auxiliary markers, for indicating positions.

6. The method of claim 1, comprising updating the stored at least one characteristic by any one of said movable units when moving along the linear stator of the electric linear motor in the elevator shaft.

7. The method of claim 1, wherein the at least one characteristic is a width of an air gap of the electric linear motor.

8. The method of claim 1, wherein the at least one characteristic relates to electromotive force of the electric linear motor.

9. The method of claim 7, comprising controlling moving of at least a second movable unit by controlling electrical current supplied to the electric linear motor based on the determined air gap and electromotive force at the plurality of positions of the elevator shaft.

10. The method of claim 1, wherein a mover of the electric linear motor comprises a plurality of independently controllable base motors or motor subunits, wherein the method comprises:

controlling movement of the mover along the linear stator by at least one of the plurality of independently controllable base motors or motor subunits; and determining the at least one characteristic by at least one other of the plurality of independently controllable base motors or motor subunits.

11. The method of claim 10, wherein the electric linear motor comprises at least three or four independently controllable base motors or motor subunits, the method comprising:

controlling the movement of the mover along the linear stator by at least the outermost base motors or motor subunits.

12. The method of claim 2, comprising storing the determined at least one characteristic to an elevator control unit, having a non-volatile memory device.

13. The method of claim 2, wherein the at least one characteristic includes position or distance data, including positions of final limits, floors, and/or door zones, and/or related to a direction changing position, based on position indicators, including an optical or a magnetic code tap.

14. The method of claim 3, wherein the at least one characteristic includes position or distance data, including positions of final limits, floors, and/or door zones, and/or related to a direction changing position, based on position indicators, including an optical or a magnetic code tap.

15. The method of claim 2, wherein the linear stator comprises markers, including magnetic teeth or auxiliary markers, for indicating positions.

16. An elevator, comprising:

an electric linear motor for moving movable units in an elevator shaft, wherein the electric linear motor comprises a linear stator extending in the elevator shaft;

a first movable unit, comprising one of the elevator cars or a motor unit, arranged to be moved along the linear stator as a commissioning operation of the elevator and configured for determining, based on the commissioning operation, at least one characteristic, including a floor position or an air gap width of the electric linear motor, at a plurality of elevator shaft positions by the first movable unit, by a winding, a coil, or a sensor, during the moving, wherein the first movable unit is configured to store the at least one characteristic in a memory device during moving along the linear stator in the commissioning operation;

a second movable unit, comprising another of the elevator cars or a second motor unit, configured to be moved in a normal operation of the elevator by utilizing the stored at least one characteristic, wherein the second movable unit is configured to utilize the stored at least one characteristic for controlling its moving along the linear stator in the normal operation, and wherein control parameters of the electric linear motor are adjusted based on the stored at least one characteristic corresponding to a determined position of the second movable unit along the elevator shaft.

17. The elevator of claim 16, wherein the at least one characteristic is position or distance data, including positions of final limits, floors, and/or door zones, and/or related to a direction changing position, based on position indicators, including an optical or a magnetic code tap.

18. The elevator of claim 16, wherein the at least one characteristic is an air gap width and/or an electromotive force of the electric linear motor.

19. The elevator of claim 16, wherein at least the first movable unit comprises a mover of the electric linear motor comprising a plurality of independently controllable base motors or motor subunits.

20. The elevator of claim 19, wherein the first movable unit is configured to control movement of the mover along the linear stator by at least one of the plurality of independently controllable base motors or motor subunits, and to determine the at least one characteristic by at least one other of the plurality of independently controllable base motors or motor subunits.

* * * * *